United States Patent
Kobayashi et al.

(10) Patent No.: US 11,459,459 B2
(45) Date of Patent: Oct. 4, 2022

(54) CURABLE SILICONE RELEASE COMPOSITION

(71) Applicant: Shin-Etsu Chemical Co., Ltd., Tokyo (JP)

(72) Inventors: Ataru Kobayashi, Gunma (JP); Toshiaki Ihara, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 187 days.

(21) Appl. No.: 16/768,610

(22) PCT Filed: Nov. 21, 2018

(86) PCT No.: PCT/JP2018/043011
§ 371 (c)(1),
(2) Date: May 29, 2020

(87) PCT Pub. No.: WO2019/111712
PCT Pub. Date: Jun. 13, 2019

(65) Prior Publication Data
US 2021/0171771 A1 Jun. 10, 2021

(30) Foreign Application Priority Data
Dec. 5, 2017 (JP) .............................. JP2017-233470

(51) Int. Cl.
| C08G 77/12 | (2006.01) |
| C08L 83/04 | (2006.01) |
| C09J 7/40 | (2018.01) |
| C08G 77/08 | (2006.01) |
| C08G 77/20 | (2006.01) |
| C08G 77/00 | (2006.01) |
| C08K 5/05 | (2006.01) |
| D21H 19/32 | (2006.01) |

(52) U.S. Cl.
CPC .............. *C08L 83/04* (2013.01); *C08G 77/08* (2013.01); *C08G 77/12* (2013.01); *C08G 77/20* (2013.01); *C08G 77/80* (2013.01); *C08K 5/05* (2013.01); *C09J 7/401* (2018.01); *D21H 19/32* (2013.01); *C08L 2203/16* (2013.01); *C08L 2205/025* (2013.01); *C08L 2205/035* (2013.01); *C09J 2400/283* (2013.01); *C09J 2483/005* (2013.01)

(58) Field of Classification Search
CPC ......... C08G 77/12; C08G 77/20; C08L 83/04; B01J 23/40
See application file for complete search history.

(56) References Cited

U.S. PATENT DOCUMENTS

| 2007/0129507 A1 | 6/2007 | Irifune | |
| 2015/0235872 A1* | 8/2015 | Yoshida | .................. C08L 83/04 264/272.17 |

FOREIGN PATENT DOCUMENTS

| CN | 101555353 A | 10/2009 |
| EP | 1788033 A2 | 5/2007 |
| EP | 2892946 A2 | 2/2015 |
| JP | 2002-356667 A | 12/2002 |
| JP | 2003-192899 A | 7/2003 |
| JP | 2007-182552 A | 7/2007 |
| JP | 2009-249570 A | 10/2009 |
| JP | 2009-263505 A | 11/2009 |
| JP | 2009-292883 A | 12/2009 |
| JP | 2014-051636 A | 3/2014 |
| WO | 2014038728 A2 | 3/2014 |
| WO | 2014038728 A3 | 3/2014 |
| WO | 2016152992 A1 | 9/2016 |
| WO | 2017087351 A1 | 5/2017 |

OTHER PUBLICATIONS

Freeman (Silicones, Published For The Plastics Institute, ILIFFE Books Ltd., 1962, p. 27).*
International Search Report for International Application No. PCT/JP2018/043011 dated Feb. 19, 2019.
European Search Report for Application No. 18886904.4 dated Jul. 30, 2021.

* cited by examiner

Primary Examiner — Kuo Liang Peng
(74) Attorney, Agent, or Firm — Rimon, P.C.

(57) ABSTRACT

Provided is a silicone composition having components (A) to (E):100 parts by mass of (A) a linear, branched, or network organopolysiloxane having a vinyl value of 0.01 mol/100 g or more and 0.04 mol/100 g or less and a viscosity of 100 mm²/sec or more and 500 mm²/sec or less at 25° C., wherein each of terminals of the organopolysiloxane has one or more alkenyl groups; 0.01 to 3 parts by mass of (B) a linear, branched, or network organopolysiloxane having a vinyl value of 0.2 mol/100 g or more and 1.2 mol/100 g or less and a viscosity of 2 mm²/sec or more and 60 mm²/sec or less at 25° C., wherein each of terminals of the organopolysiloxane has one or more alkenyl groups; (C) an organohydrogenpolysiloxane having an amount of 1 mol/100 g or more and 2 mol/100 g or less of an SiH group, wherein a ratio of the number of the SiH group in component (C) to a total number of the alkenyl groups in components (A) and (B) is 1 to 5; 0.01 to 10 parts by mass of (D) an addition-reaction control agent, relative to total 100 parts by mass of components (A), (B), and (C); and a catalytic amount of (E) a platinum group metal catalyst.

12 Claims, No Drawings

CURABLE SILICONE RELEASE COMPOSITION

CROSS REFERENCE TO RELATED APPLICATIONS

The present application is a National Stage application of and claims priority to PCT application PCT/JP2018/043011 filed Nov. 21, 2018 which claims priority to Japanese Application No. 2017-233470 filed May 12, 2017, the contents of the above application are incorporated by reference herein in their entireties.

TECHNICAL FIELD

The present invention relates to a curable silicone composition, specifically a solvent-free silicone composition for release paper, which silicone composition gives, by being cured at a low temperature for a short time, a cured product having excellent adhesiveness to a base material, and a low release force.

BACKGROUND ART

Conventionally, a cured film of a silicone composition is formed on a surface of a sheet-form base material such as paper and a plastic sheet to have a release property so that the base material does not bond to or fix to an adhesive material. Patent Documents 1 to 3 disclose methods for forming a cured silicone film on a base material surface, as follows.
(1) A method for forming a releasable film by addition-reacting an organopolysiloxane having an alkenyl group with an organohydrogenpolysiloxane in the presence of a platinum compound catalyst (Patent Document 1: Japanese Patent Application Laid-Open No. S47-32072/1972).
(2) A method for forming a releasable film by condensation-reacting an organopolysiloxane having a functional group such as a hydroxy group or an alkoxy group in the presence of an organometallic salt catalyst (Patent Document 2: Japanese Examined Patent Application Publication No. S35-13709/1960).
(3) A method for forming a releasable film by radical-polymerizing an organopolysiloxane having an acrylic group by ultraviolet light or an electron beam in the presence of a photoreaction initiator (Patent Document 3: Japanese Patent Application Laid-Open No. S54-162787/1979).

Among them, is widely used a method for forming a releasable film by addition reaction, which offers excellent curing property and is adaptive to demands for various release properties from low-speed release to high-speed release.

The releasable film formation method by addition reaction includes a solvent type in which a silicone composition is dissolved in an organic solvent, an emulsion type in which a silicone composition is dispersed in water with an emulsifier into an emulsion, and a solvent-free type with no solvent. The solvent type is harmful to human bodies and the environment and, therefore, has been replaced with the solvent-free type in consideration of safety. The emulsion type needs much energy to remove water. The emulsion type leaves a large amount of an emulsifier in a cured product, which makes it difficult to attain a small release force (force required for being released from an adhesive tape).

Hence, solvent-free silicone compositions are most commonly used. The solvent-free type silicone composition basically comprises a base oil (vinyl group-containing siloxane), a crosslinking agent (SiH group-containing siloxane), a control agent (acetylene compound), and a platinum catalyst.

A lower crosslinking density in a cured product prepared from a solvent-free silicone composition is preferred in order to reduce the release force when a tape is released from the cured film at such a low speed as 0.3 in/min. The crosslinking density means a density of cross-link of a T unit and a Q unit in silethylene bonds formed by reaction of a vinyl group of a base oil with an SiH group of a crosslinking agent. The T unit means an $R'SiO_{3/2}$ unit and the Q unit means an $SiO_{4/2}$ unit, wherein R' is a monovalent hydrocarbon group. Meanwhile, a higher crosslinking density is preferred in order to reduce the release force when a tape is released from the cured film at such a high speed as 60 m/min. The release force can be further reduced by adding an unreactive silicone oil.

A silicone for release paper is required to adhere closely to a base material, such as paper and a film. The adhesive property is thought to owe to an SiH group. This is because a composition having a small amount of the SiH group results in poor adhesive property in many cases and, in such a case, incorporation of an SiH group-containing siloxane improves the adhesive property. When a polyethylene laminated paper is used as a base material, polyethylene has poor heat resistance and may deform. To avoid this, a silicone has to be cured at such as a low temperature as 90 to 120° C. However, a release film obtained by curing a conventional silicone composition at such a low temperature may drop off from a paper base material several days later or in conditions of high temperature and humid (that is, the cured silicone film peels off, like eraser leavings).

A low release force from an adhesive tape at a low speed is contrary to good adhesion to a base material. In order to reduce the release force, the SiH amount is reduced, then the adhesion deteriorates. A method of adding an unreactive silicone to a silicone composition is known in order to reduce the release force. Then, the adhesion decreases further due to the incorporated unreactive silicone. A cured film has a higher crosslinking density by increasing the amount of an SiH group. Then, the amount of the residual SiH group is larger, resulting in a higher release force.

For the adhesive property to a plastic film such as a polyethylene terephthalate film, Patent Document 4, Japanese Patent No. 4994292, discloses a solvent-free curable silicone release composition comprising (A) 100 parts of a branched siloxane having at least 1.4 and less than 2.0 alkenyl groups per molecule and a viscosity of 50 to 5,000 mPa·s or a branched siloxane having at least 1.6 and less than 3.0 alkenyl group per molecule, (B) 1 to 50 parts of an alkenyl group-containing siloxane having a viscosity of 5 to 100 mPa-s, (C) 2 to 50 parts of an SiH group-containing siloxane, (D) an addition reaction inhibitor, and (E) a platinum catalyst.

PRIOR ART DOCUMENTS

Patent Documents

Patent Document 1: Japanese Patent Application Laid-Open No. S47-32072/1972
Patent Document 2: Japanese Examined Patent Application Publication No. S35-13709/1960

Patent Document 3: Japanese Patent Application Laid-Open No. S54-162787/1979

Patent Document 4: Japanese Patent No. 4994292

SUMMARY OF THE INVENTION

Problems to be Solved by the Invention

A cured product obtained by curing the silicone composition of Patent Document 4 at a high temperature has excellent adhesion to a plastic film. However, a cured product obtained by curing the silicone composition at a low temperature for a short time may drop off from a polyethylene laminated paper which requires low temperature curing. This is because the branched diorganopolysiloxane (A) has unreactive terminals and only a small amount of an alkenyl group, so that curing does not proceed sufficiently at a low temperature for a short time.

In view of the above circumstances, the present invention provides an addition-reaction type of a silicone release composition which offers, even by curing at a low temperature for a short time, a cured product having excellent adhesive property to a base material and having a low release force from the base material.

Means for Solving the Problems

As results of keen research, the present inventors have found that the aforesaid purposes are attained by incorporating a small amount of an organopolysiloxane having a high vinyl value, a comparatively low viscosity and an alkenyl group at each of the terminal of the organopolysiloxane, in an addition-curable silicone composition which has a comparatively large amount of an SiH group and comprises an organopolysiloxane having a low vinyl value and a comparatively high viscosity and an alkenyl group at each of the terminals of the organopolysiloxane, and an organohydrogenpolysiloxane; and, then, its cured product has excellent adhesive property to a base material and has a low release force from an adhesive tape. The inventors have also found that a cured film is improved to have more excellent adhesive property to a base material and have a lower release force, by further adding an organopolysiloxane having a particular amount of a phenyl group to the addition-curable silicone composition.

The present invention therefore provides a silicone composition comprising components (A) to (E):

100 parts by mass of (A) a linear, branched, or network organopolysiloxane having a vinyl value of 0.01 mol/100 g or more and 0.04 mol/100 g or less and a viscosity of 100 mm$^2$/sec or more and 500 mm$^2$/sec or less at 25° C., wherein each of terminals of the organopolysiloxane has one or more alkenyl groups;

0.01 to 3 parts by mass of (B) a linear, branched, or network organopolysiloxane having a vinyl value of 0.2 mol/100 g or more and 1.2 mol/100 g or less and a viscosity of 2 mm$^2$/sec or more and 60 mm$^2$/sec or less at 25° C., wherein each of terminals of the organopolysiloxane has one or more alkenyl groups;

(C) an organohydrogenpolysiloxane having an amount of 1 mol/100 g or more and 2 mol/100 g or less of an SiH group, wherein a ratio of the number of the SiH group in component (C) to a total number of the alkenyl groups in components (A) and (B) is 1 to 5;

0.01 to 10 parts by mass of (D) an addition-reaction control agent, relative to total 100 parts by mass of components (A), (B), and (C); and a catalytic amount of (E) a platinum group metal catalyst.

The present invention also provides the silicone composition further comprising 0.1 to 10 parts by mass of (F) a phenyl group-containing organopolysiloxane, wherein a ratio of the number of a phenyl group bonded to a silicon atom to a total number of groups bonded each to a silicon atom of the phenyl group-containing organopolysiloxane is 0.02 to 0.1, and said phenyl group-containing organopolysiloxane has neither a hydrogen atom nor alkenyl group bonded to a silicon atom, and has a viscosity of 1,000 mm$^2$/see or more and 5,000 mm$^2$/sec or less at 25° C.

The present invention further provides a release sheet comprising a sheet-form base material and a film obtained by curing the above-mentioned composition on a side of the base sheet.

The requirement in component (A) and component (B), "each of terminals of the organopolysiloxane has one or more alkenyl groups", means that each M units (unit represented by R'$_3$SiO$_{1/2}$) which blocks terminals of a linear, branched, or network organopolysiloxane has at least one alkenyl group (in other words, at least one of R' is an alkenyl group).

Effects of the Invention

A silicone composition of the present invention exhibits excellent curing property even in curing conditions of a low temperature and a short time to give a cured product having excellent adhesive property to a base material such as a polyethylene laminated paper. The cured film has a low release force from an adhesive tape. In particular, the cured film can be released from an adhesive tape at a small force both in a low release speed and a high release speed.

EMBODIMENTS OF THE INVENTION

The present invention will be described below in more detail.

A component (A) is a linear, branched, or network organopolysiloxane having a vinyl value of 0.01 mol/100 g or more and 0.04 mol/100 g or less and a viscosity of 100 mm$^2$/sec or more and 500 mm$^2$/sec or less at 25° C., wherein each of terminals of the organopolysiloxane has one or more alkenyl groups. A silicone composition of the present invention comprises this organopolysiloxane having a low vinyl value as a base polymer.

The organopolysiloxane has a vinyl value of 0.01 to 0.04 mol/100 g, preferably 0.015 to 0.035 mol/100 g. If the vinyl value is less than the lower limit, such an organopolysiloxane has a too large molecular weight, thus a too high viscosity, and is difficult to stir or apply. If the vinyl value is larger than the upper limit, such an organopolysiloxane contains low molecular weight ones and has a high ratio of an alkenyl group in the whole siloxane, so that a composition may have a too much low viscosity and thus may be transferred only in a smaller amount from a roller to a base material or may give a coated surface with unevenness, and a cured film has an excessively high crosslinking density, resulting in an excessively large release force.

Component (A) has a viscosity of 100 to 500 mm$^2$/sec at 25° C., preferably 200 to 500 mm$^2$/sec. If the viscosity is less than the lower limit, such a composition has higher surface wettability, thus spreads too much, and does not remain in an insufficient coating amount on a base material surface. If viscosity is larger than the upper limit, such a composition has poor surface wettability, and is difficult to spread to show a poor coating property. In the present invention, the viscosity is determined at 25° C. with an Ostwald viscometer.

Component (A) is preferably represented by the following formula (2). Component (A) may be a single compound or a combination of two or more compounds.

$$(R^1R^2{}_2SiO_{1/2})_a(R^2{}_2SiO)_b(R^2SiO_{3/2})_c(SiO_{4/2})_d \quad (2)$$

wherein $R^2$ is, independently of each other, a substituted or unsubstituted monovalent hydrocarbon group having no aliphatic unsaturated bond and having 1 to 16 carbon atoms; $R^1$ is an alkenyl group having 2 to 10 carbon atoms; and a to d are integers satisfying the equations: $2 \leq a \leq 18$, $10 \leq b \leq 400$, $0 \leq c \leq 8$, $0 \leq d \leq 8$, and $0 \leq c+d \leq 8$)

$R^1$ is an alkenyl group having 2 to 10 carbon atoms, such as a vinyl group, an allyl group, a butenyl group, a propenyl group, a 5-hexenyl group, an octenyl group, and a decenyl group. Of them, a vinyl group is preferred.

In the formula, $R^2$ is, independently of each other, a substituted or unsubstituted monovalent hydrocarbon group having no aliphatic unsaturated bond and having 1 to 16 carbon atoms, preferably 1 to 8 carbon atoms. Examples of $R^2$ include alkyl groups such as a methyl group, an ethyl group, a propyl group, a butyl group, and an octyl group; cycloalkyl groups such as a cyclohexyl group; aryl groups such as a phenyl group, a tolyl group, a xylyl group, and a naphthyl group; aralkyl groups such as a benzyl group and a phenethyl group; and those alkyl groups wherein a part or all of the hydrogen atoms are replaced with a halogen atom, such as a chloropropyl group and a trifluoropropyl group. From the viewpoint of curing property and a low release force, preferably 80% by mole or more of $R^2$ is a methyl group.

In formula (2), the numeric value represented by b, that is, the number of the $R^2{}_2SiO$ unit, is 10 to 400, preferably 50 to 400, and more preferably 100 to 300. If the number of the $R^2{}_2SiO$ unit is less than the lower limit, a cured product has an excessively high crosslinking density and has a high release force. If the number of the $R^2{}_2SiO$ unit is more than the upper limit, the polyorganosiloxane has an excessively high viscosity and, accordingly, a silicone composition has an excessively high viscosity and has poor coating properties. The numeric value represented by a, that is, the number of the $R^1R^2{}_2SiO_{1/2}$ unit, is 2 to 18, preferably 2 to 10.

In formula (2), the numbers represented by c and d, that is, the number of the $R^2SiO_{3/2}$ unit and the number of the $SiO_{4/2}$ unit, respectively, are, independently of each other, 0 to 8, preferably 0 to 4, and a total of c and d is 0 to 8, preferably 0 to 4. If the total of c and d is more than 8, a cured product has an excessively high crosslinking density and has a high release force.

Examples of the organopolysiloxane (A) include those represented by the following formulae.

$$(R^1R^2{}_2SiO_{1/2})_2(R^2{}_2SiO)_b$$

$$(R^1R^2{}_2SiO_{1/2})_a(R^2{}_2SiO)_b(R^2SiO_{3/2})_c$$

$$(R^1R^2{}_2SiO_{1/2})_a(R^2{}_2SiO)_b(SiO_{4/2})_d$$

$$(R^1R^2{}_2SiO_{1/2})_3(R^2{}_2SiO)_b(R^2SiO_{3/2})_c(SiO_{4/2})_d$$

wherein $R^2$, $R^1$, and a to d are as defined above.

More specific examples include those represented by the following formulae.

$$(ViMe_2SiO_{1/2})_2(Me_2SiO)_{160}$$

$$(ViMe_2SiO_{1/2})_2(Me_2SiO)_{130}(Ph_2SiO)_5$$

$$(ViMe_2SiO_{1/2})_3(Me_2SiO)_{170}(MeSiO_{3/2})_1$$

$$(ViMe_2SiO_{1/2})_6(Me_2SiO)_{230}(MeSiO_{3/2})_4$$

$$(ViMe_2SiO_{1/2})_{14}(Me_2SiO)_{190}(SiO_{4/2})_6$$

$$(ViMe_2SiO_{1/2})_8(Me_2SiO)_{220}(MeSiO_{3/2})_2(SiO_{4/2})_2$$

wherein Me, Vi, and Ph mean a methyl group, a vinyl group, and a phenyl group, respectively.

Component (B) is a linear, branched, or network organopolysiloxane having a vinyl value of 0.2 mol/100 g or more and 1.2 mol/100 g or less and a viscosity of 2 mm²/sec or more and 60 mm²/sec or less at 25° C., wherein each of all terminals of the organopolysiloxane has one or more alkenyl groups. The silicone composition of the present invention comprises component (B) in an amount of 0.01 to 3 parts by mass, per 100 parts by mass of the above component (A). The silicone composition of the present invention contains many SiH groups in order to improve the adhesive property to a base material. Meanwhile, the incorporation of a small amount of component (B) having the high vinyl value avoid incorporation of an excess amount of the SiH group per 100 g of the composition to thereby decrease the release force.

Component (B) preferably has a vinyl value of 0.2 to 1.2 mol/100 g, more preferably 0.2 to 0.8 mol/100 g. If component (B) has a vinyl value less than the lower limit, it is difficult to reduce an excess amount of the SiH group by incorporation of a small amount of component (B): and, in addition, a resulting cured product has a too high release force from an adhesive tape. If component (B) has a vinyl value larger than the upper limit, a cured product has a too high crosslinking density and has a too high release force.

Component (B) has a viscosity of 2 to 60 mm²/sec, preferably 5 to 40 mm²/sec, at 25° C. Component (B) having a viscosity lower than the lower limit may have poor compatibility in the whole composition. If component (B) has a viscosity larger than the upper limit, the amount of a vinyl group to react with an excess amount of the SiH group is too small, and the release force may not be reduced.

Component (B) is preferably an organopolysiloxane represented by formula (3). Component (B) may be a single compound or a combination of two or more compounds.

$$(R^1R^2{}_2SiO_{1/2})_e(R^2{}_2SiO)_f(R^2SiO_{3/2})_g(SiO_{4/2})_h \quad (3)$$

wherein $R^2$ is, independently of each other, a substituted or unsubstituted, monovalent hydrocarbon group having no aliphatic unsaturated bond and having 1 to 16 carbon atoms, $R^1$ is, independently of each other, an alkenyl group having 2 to 10 carbon atoms, and e to h are integers satisfying the equations: $3 \leq e \leq 24$, $0 \leq f \leq 60$, $1 \leq g \leq 22$, $0 \leq h \leq 11$, and $1 \leq g+h \leq 22$. Examples of $R^1$ and $R^2$ include the groups defined for formula (2).

In formula (3), the numeric value represented by f, that is, the number of the $R^2{}_2SiO$ unit, is 0 to 60, preferably 0 to 30. If the number of the $R^2{}_2SiO$ unit is larger than the upper limit, the amount of a vinyl group to react with an excess amount of the SiH group is too small, and the release force may not be reduced. The numeric value represented by e, that is, the number of the $R^1R^2{}_2SiO_{1/2}$ unit is 3 to 24, preferably 3 to 18.

In formula (3), the numeric value represented by g, that is, the number of the $RSiO_{3/2}$ unit, is 1 to 22, preferably 1 to 15. In formula (3), the numeric value represented by h, that is, the number of the $SiO_{4/2}$ unit is 0 to 11, preferably 0 to 8. A total of g and h is 1 to 22, preferably 1 to 15. If the total of g and h is more than 22, a resulting cured product has a too highcrosslinking density and has a too high release force.

The amount of component (B) is 0.01 to 3 parts by mass, preferably 0.1 to 3 parts by mass, per 100 parts by mass of component (A). If the amount of component (B) is less than the lower limit, an amount of excessive SiH groups in a resulting cured product is not reduced, and a release force is reduced in some cases. If the amount of component (B) is larger than the upper limit, a cured product has a too high crosslinking density and has a too high release force.

Examples of the organopolysiloxane (B) include the compounds represented by the following formulae.

$$(R^1R^2_2SiO_{1/2})_e(R^2SiO_{3/2})_g$$

$$(R^1R^2_2SiO_{1/2})_e(SiO_{4/2})_h$$

$$(R^1R^2_2SiO_{1/2})_e(R^2_2SiO)_f(R^2SiO_{3/2})_g$$

$$(R^1R^2_2SiO_{1/2})_e(R^2_2SiO)_f(R^2SiO_{3/2})_g(SiO_{4/2})_h$$

wherein $R^2$, $R^1$, and e to h are as defined above.

More specific examples of component (B) include the compounds represented by the following formulae.

$$(ViMe_2SiO_{1/2})_3(PhSiO_{3/2})_1$$

$$(ViMe_2SiO_{1/2})_{14}(MeSiO_{3/2})_{12}$$

$$(ViMe_2SiO_{1/2})_6(SiO_{4/2})_2$$

$$(ViMe_2SiO_{1/2})_5(Me_2SiO)_2(MeSiO_{3/2})_3$$

$$(ViMe_2SiO_{1/2})_3(Me_2SiO)_{12}(PhSiO_{3/2})_1$$

$$(ViMe_2SiO_{1/2})_9(Me_2SiO)_{20}(MeSiO_{3/2})_1(SiO_{4/2})_3$$

wherein Me, Vi, and Ph mean a methyl group, a vinyl group, and a phenyl group, respectively.

Component (C) is an organohydrogensiloxane which has a hydrogen atom(s) each bonded to a silicon atom (hereinafter, referred to as "SiH group") and an amount of an SiH group is 1 mol/100 g or more and 2 mol/100 g or less. Component (C) preferably has three or more SiH groups per molecule. The SiH groups undergo addition reaction with the alkenyl groups of the components (A) and (B) to form a cured film. The presence of the SiH groups enables an improvement in adhesive property to a base material.

Component (C) has the SiH groups in an amount of 1 mol/100 g or more and 2 mol/100 g or less, preferably 1.0 to 1.6 mol/100 g. If the amount of the SiH group is less than the lower limit, a cured film has poor adhesive property to a base material. If the amount of the SiH group is larger than the upper limit, a cured film has an excessively high crosslinking density and has a too high release force from a base material.

A larger amount of the SiH group in the composition improves the adhesive property to a base material. The amount of the SiH is preferably 40 to 100 mmol, more preferably 40 to 80 mmol, per 100 g of the composition. If the SiH amount is less than the lower limit, a cured film may have poor adhesive property to a base material. If the SiH amount is more than the upper limit, a cured film has an excessive residual SiH amount and has a too high release force from a base material, which is unfavorable.

To have the aforesaid amount of the SiH group, component (C) is incorporated in such an amount that a ratio of the number of SiH groups in component (C) to a total number of the alkenyl groups of the components (A) and (B) is 1 to 5, preferably 1.3 to 2.5, and more preferably 1.8 to 2.5. If the amount of component (C) is less than the lower limit, such a composition has poor curing property, and a cured product has poor adhesive property to a base material. If the amount is more than the upper limit, a cured product has a too high release force from a base material, and practical release properties are not obtained.

Component (C) is preferably one or more linear, branched, or cyclic organohydrogenpolysiloxanes represented by average composition formula (4).

$$R_iH_jSiO_{(4-i-j)/2} \quad (4)$$

wherein R is, independently of each other, a substituted or =substituted, monovalent hydrocarbon group having 1 to 16 carbon atoms and having no aliphatic unsaturated bond, i is the number of 0 to 2.7, j is the number of 0.3 to 3.0, wherein $0.3 \leq i+j \leq 3.0$, provided that one molecule has total three or more of the RHSiO unit and $R_2HSiO_{1/2}$ unit.

The amount of component (C) is preferably 1 to 10 parts by mass and more, preferably 2 to 6 parts by mass, per 100 parts by mass of component (A). The aforesaid amount of component (C) gives a cured product having an appropriate crosslinking density and adhesive property.

Examples of the organohydrogenpolysiloxane represented by formula (4) include a polymer and copolymer having at least one out of an $HSiO_{3/2}$ unit, an RHSiO unit, and an $R_2HSiO_{1/2}$ unit, and optionally further having at least one out of an $RSiO_{3/2}$ unit, an $R_2SiO$ unit, and an $R_3SiO_{1/2}$ unit. Preferably, the organohydrogenpolysiloxane has at least 3, preferably 5 to 90, and more preferably 10 to 80, RHSiO units and $R_2HSiO_{1/2}$ units in total per molecule. Component (C) may be linear, branched, or cyclic.

Component (C) may be a single compound or a combination of two or more compounds. Forty % by mass or more of the total mass of component (C) is preferably a polysiloxane represented by formula (1). Then, a cured film has preferable adhesive property to a base material.

$$(R_xH_{3-x}SiO_{1/2})_2(RHSiO)_y \quad (1)$$

wherein R is, independently of each other, a substituted or unsubstituted, monovalent hydrocarbon group having 1 to 16 carbon atoms and having no aliphatic unsaturated bond, and x and y are integers satisfying the equations: $0 \leq x \leq 3$ and $5 \leq y \leq 100$. Examples of R include the groups defined for $R^2$ above. Of them, preferred are alkyl groups such as a methyl group, an ethyl group, and a propyl group, and aryl groups such as a phenyl group and a tolyl group, particularly a methyl group.

Examples of the polysiloxane represented by formula (1) include methylhydrogensiloxane/dimethylsiloxane cyclic copolymers, dimethylsiloxane/methylhydrogensiloxane copolymers with both ends being a trimethylsiloxy group, dimethylpolysiloxane with both ends being a dimethylhydrogensiloxy group, dimethylsiloxane/methylhydrogensiloxane copolymers with both ends being a dimethylhydrogensiloxy group, methylhydrogensiloxane/diphenylsiloxane copolymers with both ends being a trimethylsiloxy group, methylhydrogensiloxane/diphenylsiloxane/dimethylsiloxane copolymers with both ends being a trimethylsiloxy group, methylhydrogensiloxane/methylphenylsiloxane/dimethylsiloxane copolymers with both ends being a trimethylsiloxy group, methylhydrogensiloxane/dimethylsiloxane/diphenylsiloxane copolymers with both ends being a dimethylhydrogensiloxy group, and methylhydrogensiloxane/dimethylsiloxane/methylphenylsiloxane copolymers with both ends being a dimethylhydrogensiloxy group.

More specific examples include the following siloxanes.

$$(Me_3SiO_{1/2})_2(MeHSiO)_{10}$$

$$(Me_3SiO_{1/2})_2(MeHSiO)_{52}$$

More specific examples of component (C) include, besides the polysiloxanes represented by formula (1), the following cyclic siloxanes:

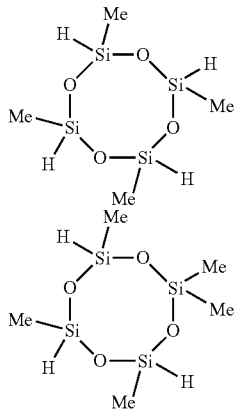

and the following linear or branched siloxanes:

(Me$_3$SiO$_{1/2}$)$_2$(MeHSiO)$_{45}$(Me$_2$SiO)$_{17}$

(Me$_3$SiO$_{1/2}$)$_2$(MeHSiO)$_{70}$(Me$_2$SiO)$_{28}$

(Me$_3$SiO$_{1/2}$)$_2$(MeHSiO)$_{55}$(Ph$_2$SiO)$_3$

(Me$_3$SiO$_{1/2}$)$_5$(MeHSiO)$_{60}$(MeSiO$_{3/2}$)$_3$

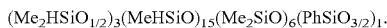
(Me$_2$HSiO$_{1/2}$)$_3$(MeHSiO)$_{15}$(Me$_2$SiO)$_6$(PhSiO$_{3/2}$)$_1$.

wherein Me and Ph mean a methyl group and a phenyl group, respectively.

Component (D) is a reaction control agent for a platinum group metal catalyst and may be any known control agent such as various organic nitrogen compounds, organophosphorus compounds, acetylene compounds, oxime compounds, and organochlorine compounds. Examples of component (D) include acetylene alcohols such as 1-ethynylcyclohexanol, 3-methyl-1-butyn-3-ol, 3,5-dimethyl-1-hexyn-3-ol, 3-methyl-1-penten-3-ol, and phenylbutynol; acetylene compounds such as 3-methyl-3-1-penten-1-yne and 3,5-dimethyl-1-hexyn-3-yne; reaction products of such an acetylene compound with an alkoxysilane, a siloxane, or a hydrogensilane; vinylsiloxanes such as cyclic tetramethylvinylsiloxane; organic nitrogen compounds such as benzotriazole; other organophosphorus compounds; oxime compounds; and organic chromium compounds. The amount of the control agent may be such as to attain treatment bath stability. The amount is typically 0.01 to 10 parts by mass, preferably 0.05 to 5 parts by mass, per total 100 parts by mass of components (A), (B), and (C).

Component (E) is a platinum group metal catalyst and functions to accelerate the addition reaction of component (A) and component (B) with component (C). Component (C) is not specifically limited and may be any known hydrosilylation catalyst. Examples of component (C) include platinum catalysts, palladium catalysts, and rhodium catalysts. Of them, a platinum catalyst is preferred because of its high activity. Examples of the platinum catalyst include chloroplatinic acid, an alcohol solution or an aldehyde solution of chloroplatinic acid, a complex of chloroplatinic acid with various olefins or vinylsiloxanes, and a complex of platinum with various olefins or vinylsiloxanes.

The amount of component (E) may be a catalytic amount. The catalytic amount is an amount effective to promote the addition reaction. From the viewpoint of obtaining a satisfactory cured film and economy, the amount is preferably 10 to 200 ppm in terms of a platinum group metal, relative to the total mass of the silicone composition, specifically to the total mass of the components (A) to (D) and, optionally, component (F).

The silicone composition of the present invention may further comprise (F) a phenyl group-containing organopolysiloxane in an amount of 0.1 to 10 parts by mass. The number of a phenyl group accounts for 2 to 10% of the total number of all groups each bonded to a silicon atom. Component (F) does not have a hydrogen atom or alkenyl group bonded to a silicon atom, and has a viscosity of 1,000 mm$^2$/sec or more and 5,000 mm$^2$/sec or less at 25° C. Component (F) is a non-functional organopolysiloxane and, therefore, does not participate in cross-linkages of the silicone composition of the present invention, and bleeds out onto a surface to reduce the release force.

Component (F) is preferably a compound represented by formula (5). Component (F) may be a single compound or a combination of two or more compounds.

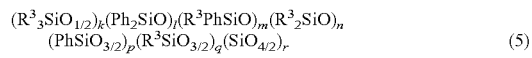
$$(R^3{}_3SiO_{1/2})_k(Ph_2SiO)_l(R^3PhSiO)_m(R^3{}_2SiO)_n(PhSiO_{3/2})_p(R^3SiO_{3/2})_q(SiO_{4/2})_r \quad (5)$$

wherein R$^3$ is, independently of each other, a monovalent hydrocarbon group having neither an aryl group nor an aliphatic unsaturated bond, and Ph is a phenyl group. The amount of a Ph group is 2 to 10% by mol, relative to the total mol of all groups (i.e., R$^3$ and Ph). k, l, m, n, p, q, and r are numbers which satisfy the equations: 0≤k≤42, 0≤l≤30, 0≤m≤60, 10≤n≤1,000, 0≤p≤20, 0≤q≤20, 0≤r≤20, 100≤l+m+n≤1,000 and 0≤p+q+r≤20.

The monovalent hydrocarbon group having neither an aryl group nor an aliphatic unsaturated bond, R$^3$, is preferably a monovalent hydrocarbon group having 1 to 16 carbon atoms, particularly 1 to 8 carbon atoms, such as alkyl groups, for instance, a methyl group, an ethyl group, a propyl group, a butyl group, and an octyl group; cycloalkyl groups such as a cyclohexyl group; and those in which a part or all of the hydrogen atoms is replaced with a halogen atom, such as a chloropropyl group and a trifluoropropyl group. From the viewpoint of curing property and a low release force, preferably 80% by mol or more of R$^3$ is a methyl group.

In formula (5), the numeric value represented by "l", that is, the number of Ph$_2$SiO unit, is 0 to 30. The numeric value represented by m, that is, the number of R$^3$PhSiO unit, is 0 to 60. The numeric value represented by n, that is, the number of R$^3{}_2$SiO unit, is 10 to 1,000. The numeric value of 1+m+n is 100 to 1,000, preferably 200 to 500. The numeric value represented by p, that is, the number of PhSiO$_{3/2}$ unit, is 0 to 20. The numeric value represented by q, that is, the number of R$^3$SiO$_{3/2}$ unit, is 0 to 20. The numeric value represented by r, that is, the number of SiO$_{4/2}$ unit, is 0 to 20. The numeric value of p+q+r is 0 to 20, preferably 0 to 10.

The amount of a Ph group is preferably 2 to 10 mol %, more preferably 3 to 8 mol %, relative to the total mol of all groups (R$^3$ and Ph). If the amount is less than the lower limit, component (F) bleeds out on the surface of a cured film to interfere with the effect of reducing the release force. If the amount is more than the upper limit, component (F) may have poor compatibility with the components (A) to (E).

Component (F) preferably has a viscosity of 1,000 to 5,000 mm$^2$/sec, more preferably 1,500 to 4,500 mm$^2$/sec, further preferably 2,000 to 4,000 mm$^2$/sec, at 25° C. If component (F) has a viscosity less than the lower limit, a larger amount of component (F) migrates onto the surface of a cured film to reduce a residual adhesion ratio and makes the surface sticky. If component (F) has a viscosity larger than the upper limit, a too small amount of the component migrates onto the surface of a cured film, and the release force may not be sufficiently reduced.

In order to reduce the release force, the amount of component (F) is preferably 0.1 to 10 parts by mass, more preferably 0.5 to 5.0 parts by mass, per 100 parts by mass of component (A). If the amount of component (F) is less than the lower limit, a too small amount of component (F) bleeds out onto the surface, and the release force is not reduced in some cases. If the amount of component (F) is larger than the upper limit, a too large amount of component (F) bleeds out onto the surface, and the residual adhesion ratio explained below may be small.

Examples of component (F) include the following compounds.

$(Me_3SiO_{1/2})_2(Ph_2SiO)_l(Me_2SiO)_n$ $(Me_3SiO_{1/2})_k(Ph_2SiO)_l(Me_2SiO)_n(MeSiO_{3/2})_p$ $(Me_3SiO_{1/2})_k(Ph_2SiO)_l(Me_2SiO)_n(SiO_{4/2})_r$ $(Me_3SiO_{1/2})_k(Ph_2SiO)_l(MePhSiO)_m(Me_2SiO)_n$
$(PhSiO_{3/2})_p(MeSiO_{3/2})_q(SiO_{4/2})_r$ wherein Me and Ph mean a methyl group and a phenyl group, respectively. k, l, m, n, p, q, and r are as defined above.

More specific examples of component (F) include the following compounds.

$(Me_3SiO_{1/2})_2(Ph_2SiO)_{15}(Me_2SiO)_{210}$ $(Me_3SiO_{1/2})_2(Ph_2SiO)_{15}(MePhSiO)_5(Me_2SiO)_{210}$ $(Me_3SiO_{1/2})_5(Ph_2SiO)_{15}(Me_2SiO)_{260}(MeSiO_{3/2})_3$ $(Me_3SiO_{1/2})_3(Ph_2SiO)_{20}(Me_2SiO)_{230}(PhSiO_{3/2})_l$ $(Me_3SiO_{1/2})_4(Ph_2SiO)_5(Me_2SiO)_{200}(SiO_{4/2})_l$ $(Me_3SiO_{1/2})_7(Ph_2SiO)_{15}(Me_2SiO)_{270}(MeSiO_{3/2})_3$
$(SiO_{4/2})_l$ wherein Me and Ph mean a methyl group and a phenyl group, respectively.

The silicone composition of the present invention may comprise additional components as needed, in addition to the above-mentioned components. The additional components may be any known additives which are usually added to a silicone release composition. Their amount is appropriately set so that the purposes and effects of the present invention are not impaired. The silicone composition of the present invention is used preferably without a solvent in consideration of safety for the environment. However, even when diluted with an organic solvent, the composition maintains the characteristics thereof.

In order to control the release force, a silicone resin, silica, an organopolysiloxane having neither a hydrogen atom nor an alkenyl group bonded to a silicon atom may be added, as needed.

The silicone composition of the present invention may be prepared by any known method. Preferably, the components (A), (B), (C) and (D), optionally component (F) and other optional components are uniformly mixed, and then component (E) is added. The silicone composition is applied evenly onto the surface of a base material such as paper and a plastic film and then is thermally cured to provide a cured film.

The temperature and time for the thermal curing may be appropriately set, depending on a type of the base material and a coating amount. For example, the composition may be cured in conditions such as about 100° C. for 60 seconds to at 200° C. for 2 seconds. The silicone composition of the present invention has excellent curing property at a low temperature for a short time. Preferably, the composition is heated at a temperature ranging from 90° C. to 120° C. for a time period ranging from 1 to 60 seconds to provide a cured film.

The silicone composition of the present invention has a viscosity of 50 to 800 mPa·s, preferably 50 to 500 mPa·s, at 25° C. The composition having a viscosity in this range is satisfactorily applied to provide a uniform film.

The silicone composition of the present invention is applied onto a sheet-form base material such as paper and a plastic film and then thermally cured in a usual manner. A sheet-form base material having a cured film of the silicone composition of the present invention on one side is suitably used as a release sheet. Examples of the plastic film include a polyethylene film, a polypropylene film, and a polyethylene terephthalate film.

The amount of the composition applied onto a surface of a base material may be any amount sufficient for formation of a cured film on the surface of the base material and is not particularly limited. For example, the amount is about 0.1 to 5.0 g/m², preferably 0.5 to 2.0 g/m². An excess amount of the composition impairs the releasability and thus is unfavorable.

EXAMPLES

The present invention will be explained in more detail with reference to the Examples and Comparative Examples, but the present invention is not limited to the Examples. The viscosity was determined with an Ostwald viscometer at 25° C. In the following description, Me, Vi, and Ph mean a methyl group, a vinyl group, and a phenyl group, respectively.

The Components used in the Examples and Comparative Examples are follows.

(A-1) Methylvinylpolysiloxane having two terminals each blocked with a dimethylvinylsiloxy group and having a vinyl value of 0.017 mol/100 g and a viscosity of 450 mm²/s:

$(ViMe_2SiO_{1/2})_2(Me_2SiO)_{160}$ (A-2) Methylvinylpolysiloxane having one branched chain, having three terminals each blocked with a dimethylvinylsiloxy group, and having a vinyl value of 0.023 mol/100 g and a viscosity of 280 mm²/s: $(ViMe_2SiO_{1/2})_3$ $(Me_2SiO)_{170}(MeSiO_{3/2})_1$ (A-3) Methylvinylpolysiloxane having five branched chains, having seven terminals each blocked with a dimethylvinylsiloxy group, and having a vinyl value of 0.033 mol/100 g and a viscosity of 320 mm²/s: $(ViMe_2SiO_{1/2})_7$ $(Me_2SiO)_{270}(MeSiO_{3/2})_5$ (B-1) Methylvinylpolysiloxane having 12 branched chains, having 14 terminals each blocked with a dimethylvinylsiloxy group and having a vinyl value of 0.67 mol/100 g and a viscosity of 20 mm²/s:

$(ViMe_2SiO_{1/2})_{12}(Me\ SiO_{3/2})_{10}$ (B-2) Methylvinylpolysiloxane having three branched chains, having five terminals each blocked with a dimethylvinylsiloxy group, and having a vinyl value of 0.61 mol/100 g and a viscosity of 10 mm²/s: $(ViMe_2SiO_{1/2})_5$ $(Me_2SiO)_2(MeSiO_{3/2})_3$ (C-1) Methylhydrogenpolysiloxane having two terminals each blocked with a trimethylsiloxy group and having an SiH group content of 1.50 mol/100 g and a viscosity of 12 mm$^2$/s:

$(Me_3SiO_{1/2})_2(MeHSiO)_{25}$ (C-2) Methylhydrogenpolysiloxane having two terminals each blocked with a trimethylsiloxy group and having an SiH group content of 1.04 mol/100 g and a viscosity of 52 mm$^2$/s:

$(Me_3SiO_{1/2})_2(MeHSiO)_{45}(Me_2SiO)_{20}$ (D) 1-Ethynylcyclohexanol (addition reaction control agent)

(E) Platinum catalyst prepared as follows

Preparation of Platinum Catalyst

A reaction product of hexachloroplatinic acid with 1,3-divinyltetramethyldisiloxane was diluted with a branched dimethylpolysiloxane having a viscosity of 250 mPa·s and represented by an average molecular formula: $(ViMe_2SiO_{1/2})_3(Me_2SiO)_{170}(MeSiO_{3/2})_1$ so as to give a platinum content of 0.28% by mass, to obtain (E) platinum catalyst to be used in the Examples and Comparative Examples.

(F) Phenyl group-containing organopolysiloxane having a ratio of the number of phenyl groups each bonded to a silicon atom to a total number of groups each bonded to a silicon atom of the phenyl group-containing organopolysiloxane is 0.05 and having a viscosity of 3,500 mPa·s:

$(Me_3SiO_{1/2})_2(Ph_2SiO)_{16}(Me_2SiO)_{300}$ (a-1) Methylvinylpolysiloxane having two terminals each blocked with a dimethylvinylsiloxy group and having a vinyl value of 0.010 mol/100 g and a viscosity of 1,200 mm$^2$/s:

$(ViMe_2SiO_{1/2})_2(Me_2SiO)_{260}$ (a-2) Methylvinylpolysiloxane having two terminals each blocked with a dimethylvinylsiloxy group and having a vinyl value of 0.051 mol/100 g and a viscosity of 80 mm$^2$/s:

$(ViMe_2SiO_{1/2})_2(Me_2SiO)_{50}$ (b-1) 1,3,5,7-Tetramethyltetravinyltetracyclosiloxane (c-1) Methylhydrogenpolysiloxane having two terminals each blocked with a dimethylhydrogensiloxy group and having an SiH group content of 0.20 mol/100 g and a viscosity of 8.0 mm$^2$/s:

$(Me_2HSiO_{1/2})_2(Me_2SiO)_{12}$

Example 1

100 Parts by mass of the methylvinylpolysiloxane (A-1) and 6.0 parts by mass of the methylvinylpolysiloxane (A-2) as component (A), 0.2 part by mass of the methylvinylpolysiloxane (B-1) as component (B), 1.5 parts by mass of the methylhydrogenpolysiloxane (C-1) and 2.2 parts by mass of the methylhydrogenpolysiloxane (C-2) as component (C), and 0.1 part by mass of 1-ethynylcyclohexanol (D) were added, wherein the ratio of the numbers of the groups, SiH/SiVi, in the whole composition was 2.3, and the whole was stirred until a uniform mixture was obtained. The platinum catalyst (E) was then added in an amount of 50 ppm in terms of platinum, relative to the total mass of components (A), (B), (C) and (D), and the whole was mixed to obtain a silicone composition 1 having a viscosity of 360 mm$^2$/s.

Examples 2 to 8 and Comparative Examples 1 to 8

The procedures of Example 1 were repeated with the components in the amounts (parts by mass) as shown in Tables 1 to 4 to obtain silicone compositions 2 to 16.

For the compositions containing component (F), the components (A) to (D) and component (F) were stirred until a uniform mixture was obtained and, then, the platinum catalyst (E) was added to obtain the silicone compositions. The platinum content in the Tables is expressed in ppm by mass of platinum, relative to the total mass of the components (A) to (D) and component (F).

The viscosities of the silicone compositions 1 to 16 were determined at 25° C. with a Brookfield rotational viscometer. The release forces and the adhesive property of the silicone compositions were determined in accordance with the following manners. The results are as shown in Tables 1 to 4.

Release Force

Low-Speed and High-Speed Release Tests:

In accordance with the FINAT method, a force required to peel a sample from an acrylic adhesive layer (i.e., release force) was determined at a release rate of 0.3 m/min or a release rate of 60 m/min in the following manner.

The silicone composition was applied on a surface of a polyethylene laminated paper (basis weight of 100 g/m$^2$) in an amount of 0.9 to 1.0 g/m$^2$ and was heated in a hot air dryer at 110° C. for 20 seconds to obtain a cured film. The film was as such subjected to separator aging at 25° C. for a day. Then, to the cured film surface, a TESA-7475 tape (tape having an acrylic adhesive) was applied, and the whole was aged with a load of 70 gf/cm$^2$ at 25° C. for 20 hours. One end of the tape was then peeled off, and the end was pulled at an angle of 180 degrees to the polyethylene laminated paper in a release rate of 0.3 m/min or a release rate of 60 m/min by using a tensile tester to determine a release force in N/25 mm. The tensile tester was AGS-50G manufactured by Shimadzu Corporation for a release rate of 0.3 m/min, and TE-702 High-Speed Peeling Tester, 300 m type, manufactured by TESTER SANGYO CO., LTD. for a release rate of 60 m/min.

Adhesive Property

The silicone composition was applied on a surface of a polyethylene laminated paper (basis weight of 100 g/m$^2$) in an amount of 0.9 to 1.0 g/m$^2$ and was heated in a hot air dryer at 110° C. for 20 seconds to obtain a cured film. The film was as such stored at 40° C. and 90% RH for 7 days. The surface of the cured film was then strongly rubbed with a finger to see whether the silicon film drops off from the paper. A sample which showed no dropping-off had a good adhesive property and was marked "G" in Tables 1 to 4. A sample showed dropping-off had a poor adhesive property and was marked "B". The dropping-off is a phenomenon in which a silicone rubber film drops off as eraser leavings when the cured film is strongly rubbed with a finger.

TABLE 1

|  |  | Example | | | |
|---|---|---|---|---|---|
|  |  | 1 | 2 | 3 | 4 |
|  |  | Silicone composition | | | |
|  |  | 1 | 2 | 3 | 4 |
| Component, parts by mass | (A-1) | 100.0 |  |  | 100.0 |
|  | (A-2) | 6.0 | 103.8 | 3.5 | 6.6 |
|  | (A-3) |  |  | 100.0 |  |
|  | (B-1 | 0.2 | 1.0 | 0.5 | 0.2 |

TABLE 1-continued

|  |  | Example |  |  |  |
|---|---|---|---|---|---|
|  |  | 1 | 2 | 3 | 4 |
|  |  | Silicone composition |  |  |  |
|  |  | 1 | 2 | 3 | 4 |
|  | (C-1) | 1.5 | 2.1 | 2.4 | 3.1 |
|  | (C-2) | 2.2 | 3.0 | 3.5 |  |
|  | (D) | 0.1 | 0.1 | 0.1 | 0.1 |
|  | (E) | 2.0 | 2.0 | 2.0 | 2.0 |
| The total mass of components (B), (C) and (D), relative to 100 parts by mass of component (A) |  | 3.8 | 6.0 | 6.2 | 3.1 |
| Platinum content, ppm |  | 50 | 50 | 50 | 50 |
| SiH group content of 100 parts by mass of the composition, mmol |  | 41 | 56 | 64 | 42 |
| H/Vi |  | 2.3 | 2.1 | 1.9 | 2.3 |
| Viscosity, mPa·s |  | 360 | 220 | 260 | 370 |
| Release force, 0.3 m/min, N/25 mm |  | 0.12 | 0.13 | 0.13 | 0.11 |
| Release force, 60 m/min, N/25 mm |  | 0.19 | 0.16 | 0.18 | 0.19 |
| Adhesive property |  | G | G | G | G |

TABLE 2

|  |  | Example |  |  |  |
|---|---|---|---|---|---|
|  |  | 5 | 6 | 7 | 8 |
|  |  | Silicone composition |  |  |  |
|  |  | 5 | 6 | 7 | 8 |
| Component, parts by mass | (A-1) | 100.0 | 100.0 | 100.0 | 100.0 |
|  | (A-2) | 5.0 | 3.5 | 4.5 | 1.8 |
|  | (B-1) | 0.2 | 1.0 |  |  |
|  | (B-2) |  |  | 0.5 | 2.0 |
|  | (C-1) | 1.5 | 1.8 | 1.6 | 2.1 |
|  | (C-2) | 2.2 | 2.6 | 2.3 | 3.0 |
|  | (D) | 0.1 | 0.1 | 0.1 | 0.1 |
|  | (E) | 2.0 | 2.0 | 2.0 | 2.0 |
|  | (F) | 1.0 | 1.0 | 1.0 | 1.0 |
| The total mass of components (B), (C), (D) and (F), relative to 100 parts by mass of component (A) |  | 4.7 | 6.2 | 5.2 | 8.0 |
| Platinum content, ppm |  | 50 | 50 | 50 | 50 |
| SiH group content of 100 parts by mass of the composition, mmol |  | 41 | 48 | 43 | 56 |
| H/Vi |  | 2.3 | 2.2 | 2.3 | 2.1 |
| Viscosity, mPa·s |  | 360 | 280 | 330 | 270 |
| Release force, 0.3 m/min, N/25 mm |  | 0.06 | 0.07 | 0.07 | 0.07 |
| Release force, 60 m/min, N/25 mm |  | 0.14 | 0.17 | 0.14 | 0.17 |
| Adhesive property |  | G | G | G | G |

TABLE 3

|  |  | Comparative Example |  |  |  |
|---|---|---|---|---|---|
|  |  | 1 | 2 | 3 | 4 |
|  |  | Silicone composition |  |  |  |
|  |  | 9 | 10 | 11 | 12 |
| Component, parts by mass | (A-1) | 100.0 | 100.0 |  |  |
|  | (A-2) | 6.9 | 4.9 | 6.4 | 1.2 |
|  | (a-1) |  |  | 100.0 |  |
|  | (a-2) |  |  |  | 100.0 |
|  | (B-1) | 0 | 0.2 | 0.6 | 0.2 |
|  | (C-1) | 1.2 | 2.0 |  | 3.5 |
|  | (C-2) | 1.7 |  | 1.7 | 5.0 |
|  | (c-1) |  | 2.8 |  |  |
|  | (D) | 0.1 | 0.1 | 0.1 | 0.1 |
|  | (E) | 2.0 | 2.0 | 2.0 | 2.0 |

TABLE 3-continued

|  | Comparative Example |  |  |  |
|---|---|---|---|---|
|  | 1 | 2 | 3 | 4 |
|  | Silicone composition |  |  |  |
|  | 9 | 10 | 11 | 12 |
| The total mass of components (B), (C) and (D), relative to 100 parts by mass of component (A) | 2.9 | 2.2 | 3.4 | 8.7 |
| Platinum content, ppm | 50 | 50 | 50 | 50 |
| SiH group content of 100 parts by mass of the composition, mmol | 33 | 31 | 32 | 93 |
| H/Vi | 2.0 | 1.8 | 2.3 | 2.0 |
| Viscosity, mPa·s | 360 | 330 | 1060 | 70 |
| Release force, 0.3 m/min, N/25 mm | 0.09 | 0.12 | 0.13 | 0.25 |
| Release force, 60 m/min, N/25 mm | 0.26 | 0.21 | 0.29 | 0.24 |
| Adhesive property | B | B | B | G |

TABLE 4

|  |  | Comparative Example |  |  |  |
|---|---|---|---|---|---|
|  |  | 5 | 6 | 7 | 8 |
|  |  | Silicone composition |  |  |  |
|  |  | 13 | 14 | 15 | 16 |
| Component, parts by mass | (A-1) | 100.0 | 100.0 | 100.0 | 100.0 |
|  | (A-2) | 6.5 | 5.2 | 0.3 | 5.0 |
|  | (B-1) | 0 | 0 | 3.5 |  |
|  | (b-1) |  |  |  | 0.5 |
|  | (C-1) | 1.0 | 1.5 | 2.1 | 1.4 |
|  | (C-2) | 1.5 | 2.2 | 3.0 | 2.0 |
|  | (D) | 0.1 | 0.1 | 0.1 | 0.1 |
|  | (E) | 2.0 | 2.0 | 2.0 | 2.0 |
|  | (F) | 1.0 | 1.0 | 1.0 | 1.0 |
| The total mass of components (B), (C), (D) and (F), relative to 100 parts by mass of component (A) |  | 3.3 | 4.5 | 9.6 | 4.3 |
| Platinum content, ppm |  | 50 | 50 | 56 | 50 |
| SiH group content of 100 parts by mass of the composition, mmol |  | 27 | 41 | 49 | 37 |
| H/Vi |  | 1.6 | 2.4 | 1.6 | 1.7 |
| Viscosity, mPa·s |  | 360 | 330 | 310 | 390 |
| Release force, 0.3 m/min, N/25 mm |  | 0.08 | 0.15 | 0.14 | 0.13 |
| Release force, 60 m/min, N/25 mm |  | 0.21 | 0.25 | 0.23 | 0.23 |
| Adhesive property |  | B | G | G | B |

As seen in Tables 3 and 4, the compositions of Comparative Examples 1 and 5 containing no component (B) and the composition of Comparative Example 2 containing the hydrogensiloxane having the low SiH group content gave the films having the poor adhesive property to the base material, and the silicone films dropped off from the base material. The cured films prepared from the composition of Comparative Example 4 containing, instead of component (A), a methylvinylpolysiloxane having a vinyl value of 0.051 mol/100 g and a viscosity of 80 mm²/s, the composition of Comparative Example 6 containing no component (B) and containing, instead, the increased amount of component (C), and the composition of Comparative Example 7 containing more than 3.0 parts by mass of component (B) had a satisfactory adhesive property to a base material, but required a large force for release from the adhesive tape. The composition of Comparative Example 8 containing, instead of component (B), a cyclic organopolysiloxane having alkenyl groups in the side chains gave a film which had the poor adhesive property to a base material and required a large force for release from an adhesive tape. The composition of Comparative Example 3 containing, instead of component (A), the methylvinylpolysiloxane having a vinyl value of 0.010 mol/100 g and a viscosity of 1,200 mm²/s had so a high viscosity as unable to be uniformly applied on the base material, and a resulting film had the poor adhesive property to the base material and required the high release force from an adhesive tape.

In contrast, as seen in Examples 1 to 8 in Tables 1 and 2, the silicone compositions of the present invention had the high flowability at 25° C., and the resulting release sheets were satisfactory releasable from the adhesive tape with the low release force both in the low-speed release and the high-speed release. The cured films prepared from the silicone compositions had the good adhesive property to the base material even after stored at 40° C. and 90% RH for 7 days. Hence, the cured films prepared from the silicone compositions can be suitably used for a release sheet.

The residual adhesion ratio and the silicone migration were evaluated on the silicone compositions 1 to 4 produced above in accordance with the following procedures.

Residual Adhesion Ratio

The adhesive side of the TESA-7475 tape released from the release layer in the aforementioned release force determination was bonded to a stainless steel plate, and a load was applied by a reciprocation of a 2-kilogram roller. After 30 minutes, one end of the TESA-7475 tape was peeled off, and the end was pulled at an angle of 180 degrees to the stainless steel plate to release the tape in a release rate of 0.3 m/min. A force required for the release (release force A in N/25 mm) was determined.

Separately, an unused TESA-7475 tape was bonded to a stainless steel plate. In the same conditions as mentioned above, a force required to release the TESA-7475 tape from the stainless steel plate (release force B in N/25 mm) was determined.

The residual adhesion ratio in % is (A/B)×100.

TABLE 5

|  | Example 1 | Example 2 | Example 3 | Example 4 |
|---|---|---|---|---|
| Silicone composition | 1 | 2 | 3 | 4 |
| Residual adhesion ratio, % | 99 | 96 | 98 | 96 |

As seen in Table 5, even after the cured films prepared from the silicone compositions of the present invention were released from the adhesive layer, the adhesive layers had the high residual adhesion ratios.

Silicone Migration

In the same manner as in the release force determination, the cured film of each of the silicone compositions 1 to 4 was provided on the surface of the polyethylene laminated paper. On the cured film surface, a polyethylene terephthalate film having a thickness of 36 □m was stacked and bonded under a pressure of 10 MPa at room temperature for 20 hours, and then the polyethylene terephthalate film was released from the cured film. Onto the polyethylene terephthalate film surface which had been in contact with the silicone cured film, an oily ink (trade name: Magic ink, manufactured by Teranishi Chemical Industry Co., Ltd.) was applied to see if the ink was repelled. The ink was not repelled on all of the polyethylene terephthalate films. This indicates that the silicone compositions did not migrated or did slightly migrated.

INDUSTRIAL APPLICABILITY

The silicone composition of the present invention has an excellent curing property even at a low temperature for a short time and provide a cured product having an excellent adhesive property to a base material such as paper and a plastic film, and the cured film can be released from a base material with a low force both in a low-speed release and a high-speed release. The silicone composition of the present invention may be suitably used particularly as a solvent-free silicone composition for release papers.

The invention claimed is:

1. A silicone composition comprising an alkenyl group-containing organopolysiloxanes consisting of following components (A) and (B) and following components (C) to (E):

100 parts by mass of (A) a linear, branched, or network organopolysiloxane having a vinyl value of 0.01 mol/100 g or more and 0.04 mol/100 g or less and a viscosity of 100 mm²/sec or more and 500 mm²/sec or less at 25° C., and represented by following formula (2), wherein each of terminals of the organopolysiloxane has one or more alkenyl groups,

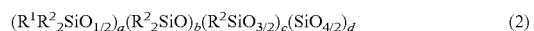

$(R^1R^2{}_2SiO_{1/2})_a(R^2{}_2SiO)_b(R^2SiO_{3/2})_c(SiO_{4/2})_d$ (2)

wherein $R^2$ is, independently of each other, a substituted or unsubstituted, monovalent hydrocarbon group having no aliphatic unsaturated bond and having 1 to 16 carbon atoms; $R^1$ is an alkenyl group having 2 to 10 carbon atoms; and a to d are integers satisfying the equations: $2 \leq a \leq 18$, $10 \leq b \leq 400$, $0 \leq c \leq 8$, $0 \leq d \leq 8$, and $0 \leq c+d \leq 8$;

0.01 to 3 parts by mass of (B) a linear, branched, or network organopolysiloxane having a vinyl value of 0.2 mol/100 g or more and 1.2 mol/100 g or less and a viscosity of 2 mm²/sec or more and 60 mm²/sec or less at 25° C., and represented by following formula (3), wherein each of terminals of the organopolysiloxane has one or more alkenyl groups,

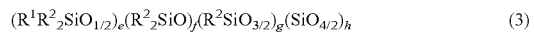

$(R^1R^2{}_2SiO_{1/2})_e(R^2{}_2SiO)_f(R^2SiO_{3/2})_g(SiO_{4/2})_h$ (3)

wherein $R^2$ is, independently of each other, a substituted or unsubstituted, monovalent hydrocarbon group having no aliphatic unsaturated bond and having 1 to 16 carbon atoms; $R^1$ is an alkenyl group having 2 to 10 carbon atoms; and e to h are integers satisfying the equations: $3 \leq e \leq 24$, $0 \leq f \leq 60$, $1 \leq g \leq 22$, $0 \leq h \leq 11$, and $1 \leq g+h \leq 22$;

(C) an organohydrogenpolysiloxane having an amount of 1 mol/100 g or more and 2 mol/100 g or less of an SiH group, wherein a ratio of the number of the SiH group in component (C) to a total number of the alkenyl groups in components (A) and (B) is 1 to 5;

0.01 to 10 parts by mass of (D) an addition-reaction control agent, relative to total 100 parts by mass of components (A), (B), and (C); and a catalytic amount of (E) a platinum group metal catalyst.

2. The silicone composition according to claim 1, further comprising 0.1 to 10 parts by mass of (F) a phenyl group-containing organopolysiloxane, wherein a ratio of the number of phenyl groups each bonded to a silicon atom to a total number of groups each bonded to a silicon atom of the phenyl group-containing organopolysiloxane is 0.02 to 0.1, and said phenyl group-containing organopolysiloxane has neither a hydrogen atom nor alkenyl group bonded to a silicon atom, and has a viscosity of 1,000 mm²/sec or more and 5,000 mm²/sec or less at 25° C.

3. A film composed of a cured silicone composition, wherein a silicone composition is according to claim 2, and the film shows a release force of 0.1 N/25 mm or less when released from an acrylic adhesive layer at a release rate of 0.3 m/min, and a release force of 0.20 N/25 mm or less when released from an acrylic adhesive layer at a release rate of 60 m/min or less, as determined in accordance with a FINAT method.

4. The silicone composition according to claim 1, wherein component (A) has 2 to 8 alkenyl groups per molecule.

5. The silicone composition according to claim 1, wherein component (B) has 3 to 24 alkenyl groups per molecule.

6. The silicone composition according to claim 1, wherein an amount of the SiH group is 40 to 100 mmol per 100 g of a total weight of the silicone composition.

7. The silicone composition according to claim 1, wherein component (C) is one or more linear, branched, or cyclic organohydrogenpolysiloxanes represented by average formula (4):

$$R_iH_jSiO_{(4-i-j)/2} \qquad (4)$$

wherein R is, independently of each other, a substituted or unsubstituted, monovalent hydrocarbon group having no aliphatic unsaturated bond and having 1 to 16 carbon atoms; i is the number of 0 to 2.7; j is the number of 0.3 to 3.0, provided that $0.3 \leq i+j \leq 3.0$; and a molecule has total three or more of RHSiO unit and RHSiO unit and $R_2HSiO_{1/2}$ unit.

8. The silicone composition according to claim 7, wherein 40% by mass or more of component (C) is a polysiloxane represented by formula (1);

$$(R_xH_{3-x}SiO_{1/2})_2(RHSiO)_y \qquad (1)$$

wherein R is as defined above; and x and y are integers satisfying the equations: $0 \leq x \leq 3$, and $5 \leq y \leq 100$.

9. The silicone composition according to claim 1, comprising no solvent.

10. A film composed of a cured silicone composition, wherein a silicone composition is according to claim 1.

11. The film according to claim 10, wherein the film shows a release force of 0.15 N/25 mm or less when released from an acrylic adhesive layer at a release rate of 0.3 m/min, and a release force of 0.20 N/25 mm or less when released from an acrylic adhesive layer at a release rate of 60 m/min or less, as determined in accordance with a FINAT method.

12. A method for preparing a film, comprising steps of:
applying the silicone composition according to claim 1 in an amount of 0.1 to 5 g/m² on a surface of polyethylene laminated paper; and
heating the composition at a temperature of from 90 to 120° C. for 1 to 60 seconds to obtain the film.

* * * * *